United States Patent
Vacha

[15] 3,695,658
[45] Oct. 3, 1972

[54] GLARE SHIELD

[72] Inventor: Fred Vacha, Lincoln Drive, Concord, N.H. 03301

[22] Filed: Nov. 9, 1970

[21] Appl. No.: 87,891

[52] U.S. Cl. ............................................296/97 C
[51] Int. Cl. ...................................................B60j 3/02
[58] Field of Search .......296/97 R, 97 B, 97 C, 97 D, 296/97 F, 97 G, 97 H, 97 K; 248/286, 302, 303

[56] References Cited

UNITED STATES PATENTS

| | | | |
|---|---|---|---|
| 3,499,679 | 3/1970 | Olander | 296/97 C |
| 2,261,692 | 11/1941 | Manley | 296/97 C |
| 1,532,308 | 4/1925 | Downing | 296/97 D |
| 1,587,144 | 6/1926 | Burk | 296/97 D |
| 1,775,486 | 9/1930 | Clements | 296/97 C |
| 2,188,612 | 1/1940 | Owen et al. | 248/303 X |
| 2,626,119 | 1/1953 | Crosby | 248/302 |
| 2,818,298 | 12/1957 | Goeske | 296/97 C |
| 2,902,167 | 9/1959 | Smith | 248/302 X |

FOREIGN PATENTS OR APPLICATIONS 257,408  5/1963  Australia..................296/97 F

*Primary Examiner*—Benjamin Hersh
*Assistant Examiner*—John A. Pekar
*Attorney*—Frederick D. Goode

[57] ABSTRACT

This disclosure relates to a tinted glare shield device which is adapted to be attached to an automobile sun visor and which is constructed so that a driver's eyes are shielded against glare from oncoming headlights while retaining unimpaired clear vision in his lane.

4 Claims, 6 Drawing Figures

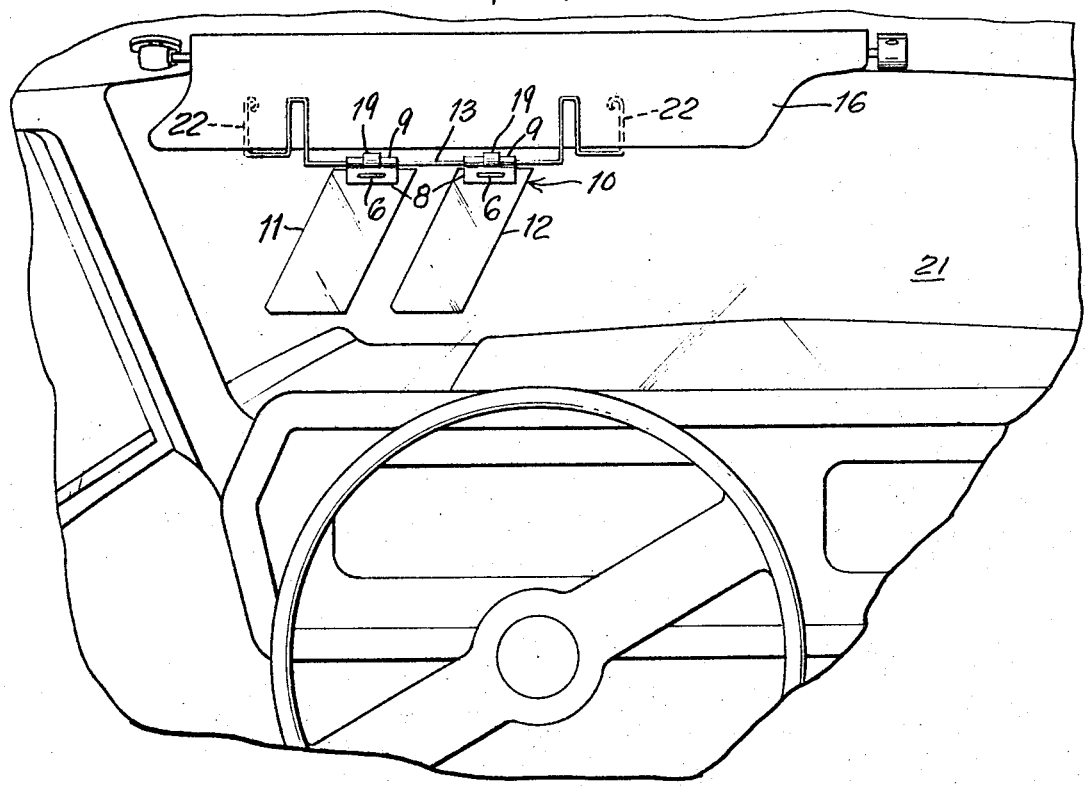
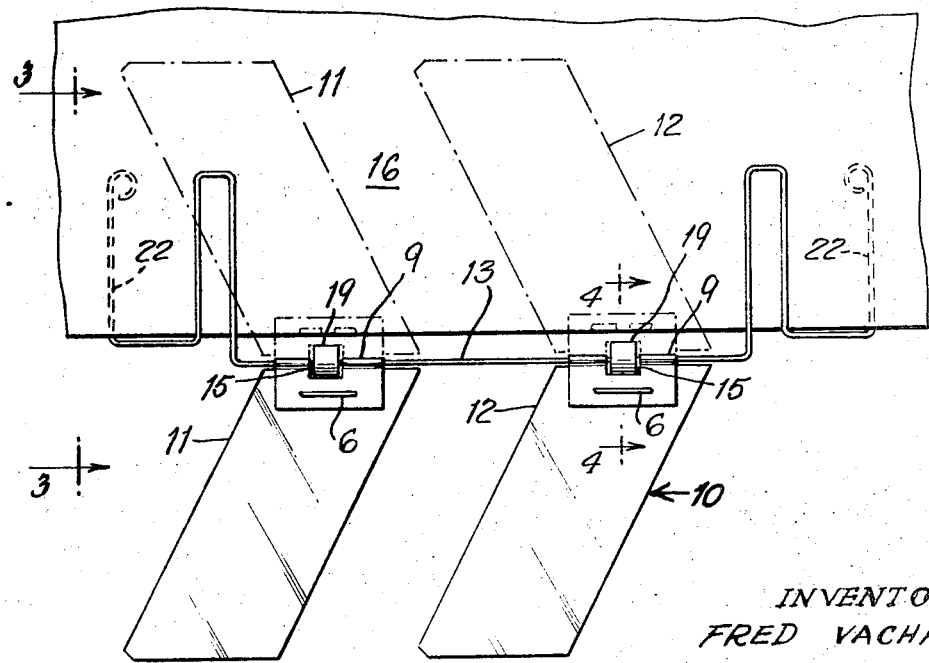

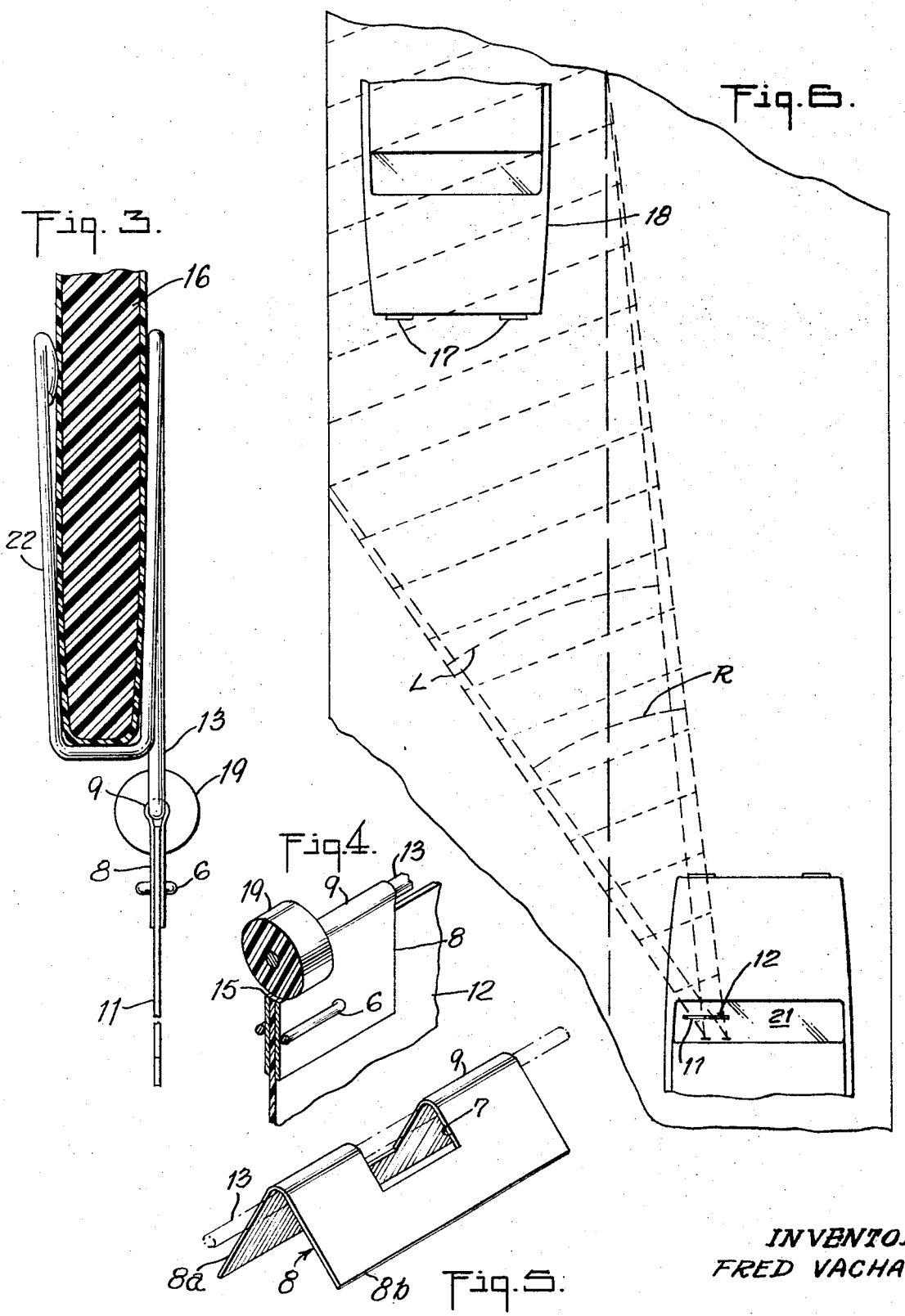

GLARE SHIELD

This invention relates to glare shields and more particularly relates to a glare shield which may be attached to an automobile sun visor for use by a driver to help prevent his visibility from being impaired by the glare of oncoming headlights.

A recognized problem with vehicular night driving is the temporary impairment of a driver's vision due to the glare from headlights of oncoming traffic. The prior art discloses various attempts to alleviate this problem by interposing any one of a variety of tinted transparent means between the driver's eyes and the source generating the glare, as for example, sunglasses, tinted windshields, and the like. In all such attempts known to me, the improvement, in one form or another, consists usually of interposing a tinted transparent device adapted to cover the entire frontal field of view of the driver. The disadvantage with such prior art devices is that because the entire field of view is color tinted to reduce glare, a driver's view under lighting conditions substantially less intense than glare is, of course, also substantially impaired, as for example, driving at night time, or suddenly driving from a brightly lighted roadway into a unlighted underpass.

I have succeeded in overcoming the disadvantage and objections of the prior art attempts to this problem by providing a tinted glare shield device for attachment to the sunvisor of an automobile and which does not encompass the driver's entire frontal field of view. Rather, this disclosure contemplates a device that provides a pair of separate glare shields oriented and configured so as to cooperatively coact with each of the driver's eyes to provide a "cone" of tinted vision which is coincident with the line of travel of the headlights from an oncoming vehicle. The separation of the shields from one another permits a driver to have a clear, untinted view of the road before him.

It is, accordingly, among the various objects of this invention to provide a glare shield device to protect a driver's visual acuity against oncoming headlight glare without reducing visibility in the driver's lane.

It is another object of this invention to provide a glare shield device which can selectively be removed from the driver's field of view during non-glare driving conditions.

It is yet another object of this invention to provide a glare shield device that can be easily attached to an automobile sun visor without in any way impairing the full utility of the sun visor itself.

These and other objects of this invention will become more apparent from the following description when taken in conjunction with the accompanying drawings, in which:

FIG. 1 illustrates an interior view of an automobile with my novel glare shield operatively attached to the sun visor;

FIG. 2 illustrates an enlarged front elevation view of my glare shield device typically attached to a conventional automobile sun visor;

FIG. 3 illustrates an enlarged cross-sectional view taken on line 3—3 of FIG. 2:

FIG. 4 illustrates an enlarged cross-sectional view taken on line 4—4 of FIG. 2;

FIG. 5 illustrates a detailed view of a partially bent hinge member on its respective frame portion; and FIG. 6 illustrates a schematic view of the developed "cones" of vision when a driver views oncoming traffic through his glare shield device.

Referring now with greater particularity to the drawings, there is shown in FIG. 2 my novel glare shield device 10 typically mounted on a conventional automobile sun visor 16. This device is comprised of a supporting frame 13 of wire or other suitable material on which are rotatably supported a pair of tinted transparent shield members 11 and 12. In the illustrated embodiment, shields 11 and 12 are made from a flexible plastic material, such as acetate, but it is to be understood that any suitable transparent material may be employed so long as it provides reasonably undistorted vision therethrough. In the illustrated embodiment of FIG. 2, each shield 11 and 12 is rotatably connected to frame 13 by a hinge member 9 of suitable material, preferably aluminum. As seen in FIG. 5, this hinge 9 is generally a rectangularly shaped piece of sheet stock 8 in its original form before bending, with a similarly shaped opening or aperture 7 centrally located therethrough. By folding the sheet 8 in half over frame 13, the end portions 8a, 8b can be fastened to each shield 11 and 12 by a staple 6 or other suitable fastening means. Hinge 9 may then be firmly crimped to wire 13 so that there is sufficient friction therebetween. Thus, either glare shield may now be rotated on its respective hinge 9 which exhibits sufficient frictional engagement with wire 13 to maintain any position it may be rotated to; that is, all the way up against sun visor 16 (as shown in dotted line in FIG. 2) when these shields are not used, or all the way down in the operative position as more clearly illustrated in FIG. 1. To assure that repeated rotational movement of hinged glare shields will not result in any undesired lateral movement, a slidable friction block 19 of rubber or other suitable material is carried by frame 13 in each recess 15 of the glare shields.

In the illustrated embodiment, the terminal ends of frame 13 are suitably formed into U-shaped clip-on portions 22 which permit the frame to be suitably attached to the sun visor as shown in FIG. 2. It should be understood that any suitable means for attaching could be employed in lieu of the illustrated clip-on portions.

Referring to FIGS. 1 and 6, my novel glare shield device 10 is shown from a driver's view looking outwardly through a conventional automobile windshield 21. As viewed from the driver's vantage point, a glare condition from oncoming vehicular traffic may arise from headlights 17 carried by oncoming car 18. As shown in FIG. 6, each of the driver's eyes coacts with its respective glare shield 11 and 12 so as to form a tinted "cone" of vision for each eye; the "cones" are identified as L and R in FIG. 6, indicating left eye and right eye. It should be apparent in view of the foregoing that shield members 11, 12 are adapted to extend from frame 13 in an oblique manner, i.e., from upper right to lower left, so as to be substantially coincident with the line of travel of oncoming glaring headlights 17. Thus, such glare can only reach the driver's eyes by first passing through tinted shields 11, 12. Since the driver always has a frontal view between the separated shields 11 and 12 through his windshield which is untinted, his frontal field of vision remains unimpaired.

It should also be clear that provision is made for lateral positioning of shields 11, 12 because such spacing is related to the spatial separation between a driver's eyes, thus, the adjustability feature of the disclosed embodiment meets the varying eye separation distances of virtually all drivers.

As can now be appreciated in light of this disclosure, once wire frame 13 is attached to sun visor 16 by means of the U-shaped clip-on end portions 22 of the frame, the sun visor may be conventionally rotated into and out of operative position along with the shield device 10.

Another novel feature of my invention is the fact that simply by reversing the illustrated position of my shield device, tinted shields 11, 12 become oriented so as to slant from upper left to lower right, thereby making this device applicable in those foreign countries where automobiles are driven on the left side of the road.

The functional utility of this device provides an instantly unshielded, i.e., untinted view of the entire frontal driving area by the driver merely tilting his head or eyes so as to move his line of sight away from the shielded view. Obviously, the shield device may be readily turned upward out of viewing range simply by turning up the sun visor. For day time driving with the sun visor 16 turned down, shields 11, 12 can simply be rotated upwardly as shown in dotted view in FIG. 2, thus providing an untinted, unshielded driver's view below the sun visor.

From the foregoing description, taken in conjunction with the accompanying drawings, the operation and advantages of the invention will be readily understood without requiring a more extended explanation.

Various changes in the form, proportion and minor details of construction may be resorted to without departing from the principal advantages of the invention.

Having thus described my invention, what I claim as new and desire to secure by Letters Patent is:

1. A glare shield device adapted for attaching to an automobile sun visor providing a separate shield aligned with each of a driver's eyes so that the left side of the road is shielded from glare and the driver's lane remains unshielded for a clear view and comprising:
   a. an elongated single member frame;
   b. means at the opposed terminal end portions of said frame for attaching the frame to an automobile sun visor; and
   c. a pair of laterally adjustable elongated parallely disposed glare shield members hinged at one end thereof intermediate the end portions of said frame and extending obliquely downwardly therefrom so as to be substantially coincident with the line of travel of oncoming headlights, said members having a width adapted to intercept only those light rays within the cone of vision of each of the driver's eyes to shield each eye from oncoming headlights while maintaining a clear view of the driver's lane.

2. The structure set forth in claim 1 wherein the said means at the opposed terminal end portions for attaching comprises a generally U-shaped configuration of said frame formed integrally therewith in a substantially coplanar relation.

3. The structure of claim 1 wherein:
   a. each glare shield is recessed at its end juxtaposed the frame, thus providing a pair of tab members thereon; and
   b. a rotatable and slidable hinge means attached to each of said shields, and frictionally secured to said frame.

4. A glare shield device adapted for attaching to an automobile sun visor and comprising:
   a. an elongated single member frame;
   b. means at the opposed terminal end portions of said frame for attaching the frame to an automobile sun visor;
   c. a pair of elongated glare shield members each recessed at its end juxtaposed the frame;
   d. a rotatable and slidable hinge means attached to each of said shields, and frictionally secured to said frame; and
   e. a slidable friction block mounted on the frame between said tab members of each glare shield to restrain lateral movement of said shield when turned upward out of the line of vision, or downward into the line of vision.

* * * * *